(12) United States Patent
Song et al.

(10) Patent No.: US 8,929,011 B1
(45) Date of Patent: Jan. 6, 2015

(54) SYNC MARK SYSTEM FOR TWO DIMENSIONAL MAGNETIC RECORDING

(71) Applicant: LSI Corporation, San Jose, CA (US)

(72) Inventors: Xiufeng Song, San Jose, CA (US); Eui Seok Hwang, San Jose, CA (US); George Mathew, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/055,886

(22) Filed: Oct. 17, 2013

Related U.S. Application Data

(60) Provisional application No. 61/890,426, filed on Oct. 14, 2013.

(51) Int. Cl.
G11B 20/10 (2006.01)
G11B 27/32 (2006.01)
G11B 20/14 (2006.01)

(52) U.S. Cl.
CPC .......... *G11B 20/10222* (2013.01); *G11B 27/32* (2013.01); *G11B 20/14* (2013.01)
USPC ......................................................... 360/39

(58) Field of Classification Search
None
See application file for complete search history.

(56) References Cited

U.S. PATENT DOCUMENTS

| | | | | |
|---|---|---|---|---|
| 5,359,584 A * | 10/1994 | Fukushima et al. | ....... | 369/53.24 |
| 5,844,920 A * | 12/1998 | Zook et al. | .................... | 714/769 |
| 5,982,977 A * | 11/1999 | Naruse et al. | ................. | 386/252 |
| 6,370,320 B1 * | 4/2002 | Sugita et al. | .................. | 386/256 |
| 6,418,133 B1 * | 7/2002 | Zhang et al. | .................. | 370/342 |
| 7,372,650 B1 * | 5/2008 | Kupferman | ..................... | 360/48 |
| 7,457,071 B1 * | 11/2008 | Sheh | .............................. | 360/75 |
| 7,561,359 B1 * | 7/2009 | Jeong et al. | ..................... | 360/48 |
| 7,710,682 B2 * | 5/2010 | Mizukoshi et al. | ............ | 360/75 |
| 7,839,594 B2 * | 11/2010 | Ozdemir | ......................... | 360/75 |
| 7,929,238 B1 | 4/2011 | Vasquez | | |
| 2002/0109929 A1 * | 8/2002 | Ashikaga et al. | .............. | 360/51 |
| 2003/0048560 A1 * | 3/2003 | Ozdemir | ......................... | 360/48 |
| 2005/0024759 A1 * | 2/2005 | Sakai et al. | ..................... | 360/48 |
| 2006/0132956 A1 * | 6/2006 | Byun et al. | ...................... | 360/51 |
| 2007/0047120 A1 * | 3/2007 | DeGroat | ......................... | 360/39 |
| 2007/0211360 A1 * | 9/2007 | Ashikaga et al. | .............. | 360/29 |
| 2008/0180826 A1 * | 7/2008 | Cho | ............................... | 360/48 |
| 2009/0040651 A1 * | 2/2009 | Kudo et al. | ................. | 360/77.01 |
| 2009/0097376 A1 * | 4/2009 | Yamaoka et al. | .............. | 369/94 |
| 2011/0157737 A1 | 6/2011 | Grundvig et al. | | |
| 2012/0106607 A1 | 5/2012 | Miladinovic et al. | | |
| 2012/0120784 A1 * | 5/2012 | Yang et al. | .................... | 369/107 |
| 2012/0124241 A1 * | 5/2012 | Yang et al. | .................... | 709/248 |
| 2013/0286502 A1 | 10/2013 | Erden et al. | | |

OTHER PUBLICATIONS

Gold Code, from Wikipedia, last modified Mar. 20, 2014.*

(Continued)

*Primary Examiner* — Peter Vincent Agustin
(74) *Attorney, Agent, or Firm* — Hamilton DeSanctis & Cha

(57) ABSTRACT

A data processing system includes an analog to digital converter operable to sample an analog signal obtained from a magnetic storage medium to yield digital samples, and a sync mark detector operable to search for a particular one of a number of sync marks in the digital samples. Each of the data tracks on the magnetic storage medium is associated with one of the sync marks. The sync mark on each of the data tracks has a different pattern than the sync marks on neighboring tracks.

20 Claims, 5 Drawing Sheets

(56) References Cited

OTHER PUBLICATIONS

U.S. Appl. No. 13/886,049, filed May 2, 2013, Xun Zhang, Unpublished.

U.S. Appl. No. 14/048,897, filed Oct. 8, 2013, George Mathew, Unpublished.

U.S. Appl. No. 14/031,990, filed Sep. 19, 2013, George Mathew, Unpublished.

U.S. Appl. No. 14/021,811, filed Sep. 9, 2013, George Mathew, Unpublished.

U.S. Appl. No. 13/777,937, filed Feb. 26, 2013, Rui Cao, Unpublished.

U.S. Appl. No. 13/773,886, filed Feb. 22, 2013, Dahua Qin, Unpublished.

U.S. Appl. No. 13/491,135, filed Jun. 7, 2012, Xun Zhang, Unpublished.

U.S. Appl. No. 13/490,913, filed Jun. 7, 2012, Xun Zhang, Unpublished.

* cited by examiner

SYNC MARK SYSTEM FOR TWO DIMENSIONAL MAGNETIC RECORDING

CROSS REFERENCE TO RELATED APPLICATIONS

The present application claims priority to (is a non-provisional of) U.S. Pat. App. No. 61/890,426, entitled "Sync Mark System For Two Dimensional Magnetic Recording", and filed Oct. 14, 2013 by Song et al, the entirety of which is incorporated herein by reference for all purposes.

FIELD OF THE INVENTION

Various embodiments of the present invention provide systems and methods for locating the position of the start of user data in each sector in each track, and more particularly to a sync mark system with multiple alternating sync mark patterns.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of the start of user data is detected using a sync mark stored on the storage medium.

SUMMARY

Various embodiments of the present invention provide systems, apparatuses and methods for locating the position of the start of user data in each sector in each track in a two dimensional magnetic recording system using multiple alternating sync mark patterns.

In some embodiments, a data processing system includes an analog to digital converter operable to sample an analog signal obtained from a magnetic storage medium to yield digital samples, and a sync mark detector operable to search for a particular one of a number of sync marks in the digital samples. Each of the data tracks on the magnetic storage medium is associated with one of the sync marks. The sync mark on each of the data tracks has a different pattern than the sync marks on neighboring tracks.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

In the sync mark system disclosed herein for two dimensional magnetic recording, at least two different sync marks are included to enable sync mark detection and to reduce the likelihood of false detection of sync marks in neighboring data tracks. In the two dimensional magnetic recording system, multiple readers are provided on a read/write head assembly. In embodiments with relatively narrow track width, there can be significant interference from neighboring tracks while reading a target track. The different sync marks are used in alternating data tracks, so the sync marks that are sought while reading a target track are different than those in the neighboring tracks. The sync marks are selected patterns or sequences with high auto-correlation values, so that a sync mark detector will readily detect the sync mark in the target track. The sync marks also have low cross-correlation values, so that when the sync mark detector is searching for a particular sync mark in the target track, the likelihood of false detection of another sync mark in a neighboring track is reduced or eliminated.

Figure 1:
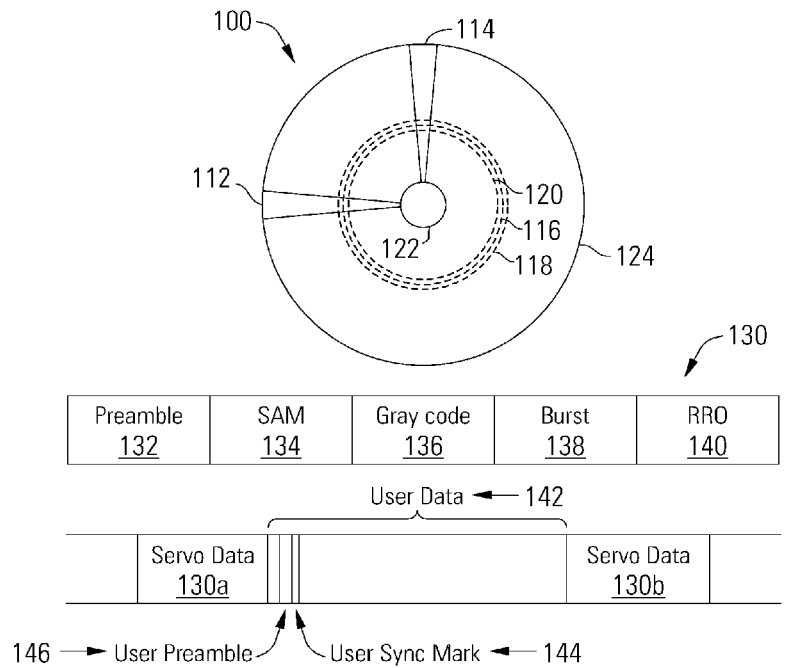
FIG. 1 is a diagram of a magnetic storage medium and sector data scheme that may be used with multiple alternating sync marks in accordance with some embodiments of the present invention.

Turning to FIG. 1, a magnetic storage medium 100 is shown with an example data track 116 and its two adjacent neighboring data tracks 118, 120, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored to storage medium 100. The data sets can include user synchronization information some of which may be used as a mark to establish a point of reference from which processing of the data within user data region 142 may begin.

The sync mark system for two dimensional magnetic recording is operable to detect target track sync marks with a reduced likelihood of erroneously detecting different sync marks in neighboring tracks.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

As used herein, the phrase "sync mark" is used in its broadest sense to mean any pattern that may be used to establish a point of reference. Thus, for example, the different alternating sync mark patterns disclosed herein are used in some embodiments as user sync marks 144 as are known in the art, or for one or more portions of servo data bit patterns 130. Based upon the disclosure provided herein, one of ordinary skill in the art may recognize other sync marks that could be used in relation to different embodiments of the present invention.

Figure 2:
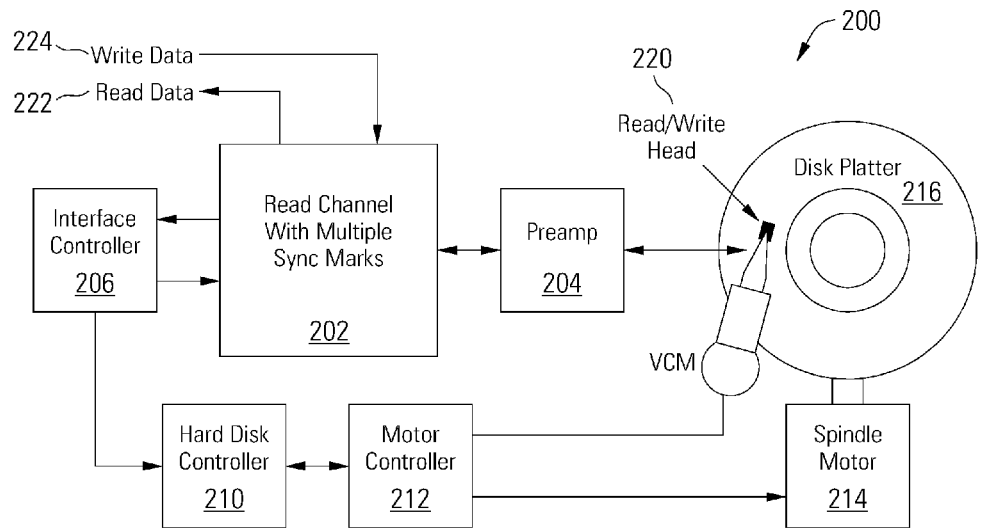
FIG. 2 depicts a storage system including a read channel with a sync mark detector for detecting different sync marks on alternating data tracks in accordance with some embodiments of the present invention.

Turning to FIG. 2, a storage system 200 is disclosed which includes a read channel circuit 202 with a sync mark detector which detects multiple different sync marks on alternating tracks in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. During read operations, read channel circuit 202 searches for a sync mark to locating the position of the start of user data. Different sync marks are written to alternating data tracks, reducing the likelihood of erroneously detecting a sync mark in a neighboring track when searching for a sync mark in a target track. In some embodiments, the sync mark detector in the read channel circuit 202 is adapted to search for the particular sync mark associated with the target track. Such a sync mark detector which detects multiple different sync marks on alternating tracks can be implemented consistent with that disclosed in relation to FIGS. 3-8. In some cases, methods of detecting different sync marks on alternating tracks are performed consistent with the flow diagram disclosed in relation to FIG. 9.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
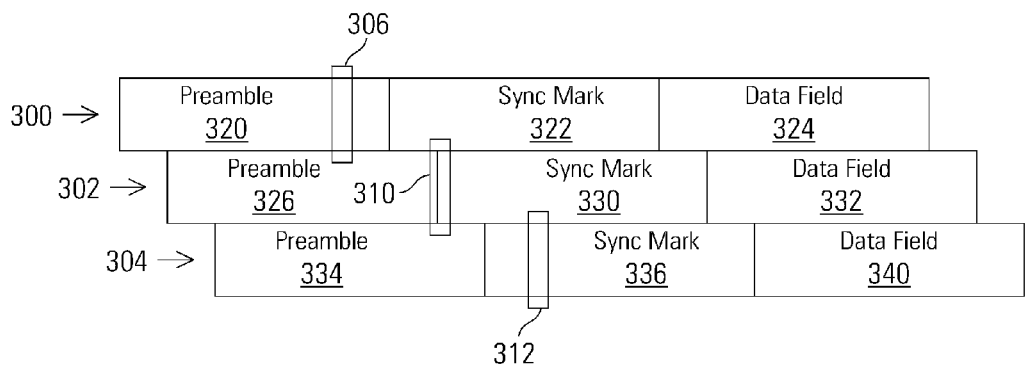
FIG. 3 depicts a series of three read heads positioned to read three adjacent data tracks in a two dimensional magnetic recording system in accordance with some embodiments of the present invention.

Turning to FIG. 3, a series of three read heads 306, 310, 312 is shown as it could be positioned to read three adjacent data tracks 300, 302, 304 in a two dimensional magnetic recording system in accordance with some embodiments of the present invention. In this embodiments, multiple read heads 306, 310, 312 are positioned to read multiple data tracks 300, 302, 304 simultaneously. Because of the width of the data tracks 300, 302, 304 and the size and position of the read heads 306, 310, 312, the data signals from each of the read heads 306, 310, 312 can have a significant interference component from adjacent data tracks. In some embodiments, the width of each of the read heads 306, 310, 312 is larger than the width of a single data track 300, 302, 304. The sectors in adjacent data tracks 300, 302, 304 are not necessarily aligned.

During operation, the disk platter spins and the read heads 306, 310, 312 move over the data tracks 300, 302, 304 searching for sync marks in preparation for a read or write operation. The read head 306 passes over data track 300, for example reading from preamble 320 and sync mark 322 to prepare to read or write a user data field 324, but receiving some signal contribution from neighboring data track 302 (and another neighboring data track, not shown). The read head 310 passes over data track 302, for example reading from preamble 326 and sync mark 330 to prepare to read or write a user data field 332, but receiving some signal contribution from neighboring data tracks 300, 304. The read head 312 passes over data track 304, for example reading from preamble 334 and sync mark 336 to prepare to read or write a user data field 340, but receiving some signal contribution from neighboring data track 302 (and another neighboring data track, not shown). The readback signal from read head 310 can therefore contain a significant contribution from data tracks 300 and 304 as it reads target data track 302.

In some embodiments, the model for the readback signal obtained from read head 310 is set forth in Equation 1:

$$r_2(t)=s_2(t)+\gamma_1 s_1(t-\Delta t_1)+\gamma_3 s_3(t-\Delta t_3)+n_2(t) \quad (Eq\ 1)$$

where $r_2$ (t) is the readback signal from read head 310, where $s_1$ is the signal contribution from neighboring track 300, offset by a $\Delta t_1$ based on the offset between data tracks 300 and 302, and the offset between read heads 306 and 310, where $\gamma_1$ is a power coefficient indicating the level of interference from track 300, where $s_3$ is the signal contribution from neighboring track 304, offset by a $\Delta t_3$ based on the offset between data tracks 300 and 304, and the offset between read heads 310 and 312, where $\gamma_3$ is a power coefficient indicating the level of interference from track 304, and where $n_2$ (t) is the noise in the readback signal. The readback signal $r_2$ (t) from read head 310 thus contains three sync mark components, one from the target track 302 and two from neighboring tracks 300, 304. By using a different sync mark in neighboring tracks 300, 304, false detection of those sync marks when reading the target track 302 will be avoided, even when the level of interference from neighboring tracks 300, 304 is relatively large.

Figure 4:
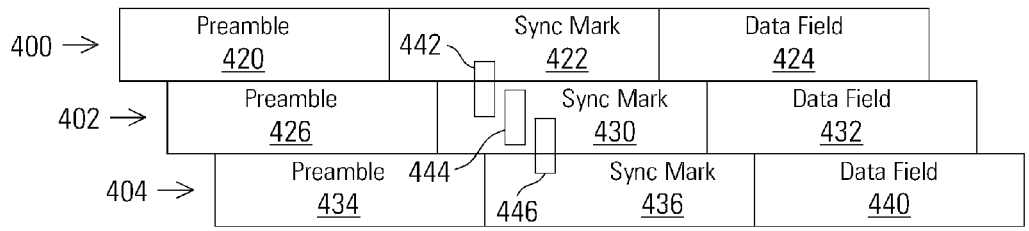
FIG. 4 depicts a series of three read heads positioned to read a target data track between two neighboring data tracks in a two dimensional magnetic recording system in accordance with some embodiments of the present invention.

Turning to FIG. 4, a series of three read heads 442, 444, 446 is shown as it could be positioned to read a data track 402, with two adjacent data tracks 400, 404 also shown in a two dimensional magnetic recording system in accordance with some embodiments of the present invention. In this embodiments, multiple read heads 442, 444, 446 are positioned to read one data track 402, generating multiple readback signals that can be jointly processed to improve data detection. Because of the width of the data tracks 400, 402, 404 and the size and position of the read heads 442, 444, 446, the data signals from one or more of the read heads 442, 444, 446 can have a significant interference component from adjacent data tracks. Each data track 400, 402, 404 can contain one or more data sectors, with a preamble 420, 426, 434 and sync mark 422, 430, 436 identifying the location of the data field 424, 432, 440. When reading data track 402, the readback signals from read heads (e.g., 442, 446) can contain significant contributions from neighboring data tracks (e.g., 400, 404, respectively) as they read target data track 402. By using different sync marks in alternating data tracks, e.g., one sync mark pattern in data track 402 and a different sync mark pattern in neighboring data tracks 400, 404, detection of the sync mark pattern in the target data track 402 can be improved while reducing likelihood of false detection of sync marks 422, 436 in neighboring data tracks 400, 404.

When selecting bit patterns to use as the sync marks, patterns with good auto-correlation values $\delta(k)$ are selected to allow the sync marks to be detected. In some embodiments of this selection process, a threshold value for the $\delta(k)$ is used, considering from among a group of candidate patterns to find those that have auto-correlation values $\delta(k)$ above the threshold. In some embodiments, the auto-correlation value $\delta(k)$ is given by the discrete time convolution summation in Equation 2:

$$\sum_n g_1(n+k)g_1(n) \to \delta(k) \quad (Eq\ 2)$$

where $g_1$ (n) is the sync mark being sought in the target track and $g_1$ (n+k) is the sync mark, offset by k, in the received data from the target track.

Furthermore, when selecting bit patterns to use as the sync marks, patterns with low cross-correlation values are selected to prevent false detection of sync marks from neighboring tracks based on interference from neighboring tracks during read and write operations. In some embodiments of this selection process, patterns are sought with cross-correlation values of zero, or in other embodiments, with cross-correlation values below a lower threshold. In some embodiments, the cross-correlation is given by the discrete time convolution summation in Equation 3:

$$\sum_n g_1(n+k)g_2(n) \to 0 \quad (Eq\ 3)$$

where $g_2(n)$ is the sync mark in the neighboring track which should not be detected, and $g_1(n+k)$ is the sync mark, offset by k, in the received data from the target track.

The correlation algorithms applied herein, including auto-correlation and cross-correlation, can be any suitable correlation algorithm, such as, but not limited to, direct correlation, block correlation, norm-distance based approaches, etc. Based upon the disclosure provided herein, one of ordinary skill in the art will recognize a variety of correlation algorithms that may be used both when selecting patterns for use as sync marks and when detecting sync marks during read and write operations.

Figure 5:
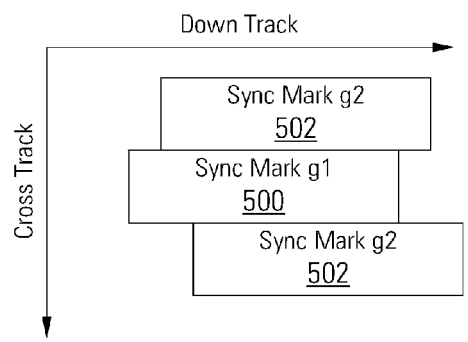
FIG. 5 is a diagram of different sync mark patterns as they might appear on a recording medium in accordance with some embodiments of the present invention.

In the sync mark system for two dimensional magnetic recording disclosed herein, at least two different sync marks 500, 502 are used in alternating data tracks as shown in FIG. 5, such that the different sync marks 500, 502 have different bit patterns or sequences. In some embodiments, one sync mark 500 is used on every other data track, such as, but not limited to, odd numbered tracks, and another sync mark 502 is used on the intervening data tracks, such as, but not limited to, even numbered tracks. In other embodiments, more than two different sync marks are used, such that sync marks in any given target track are different from and have low cross-correlation values with sync marks in its adjacent neighboring tracks.

In some embodiments, the sync marks are Gold codes or Gold sequences, binary codes with bounded low cross-correlations within a set. A set of Gold codes contains $(2^n-1)$ sequences with length $(2^n-1)$. A number of criteria are applied to the set of Gold codes to select the sync marks to be stored on the storage medium and detected when reading from the storage medium to locate the start of user data. Each Gold sequence has a good auto-correlation property, facilitating sync mark detection, and any arbitrary pair of Gold sequences have low cross-correlation, although particular sequences can be selected for use which provide a good balance of high auto-correlation and low cross-correlation values. The highest absolute cross-correlation value among the set of $(2^n-1)$ sequences is $(2^{(n+2)/2}+1)$ for even n and for $(2^{(n+1)/2}+1)$ for odd n.

When selecting from among the Gold sequences to use as the sync marks, patterns that are balanced, that is, having a number of 0's and 1's that differs by only one, or that are nearly balanced, will reduce the direct current (DC) component in the readback signal. This simplifies the design and operation of an analog front end in the read channel that compensates for DC bias in the readback signal. The level at which each selected Gold sequence used as a sync mark is balanced can be selected as desired based on the level of DC bias that can be corrected in the analog front end and based on the characteristics of the available Gold sequences. For example, in some embodiments it may be desirable to accept a small amount of DC bias from an incompletely balanced Gold sequences but which have superior auto-correlation levels and/or lower cross-correlation levels.

The set of Gold sequences from which the sync marks are selected are generated in some embodiments using two maximum length sequences. Maximum length sequences are pseudorandom binary bit sequences that can be generated using maximal linear feedback shift registers. The term "maximum length sequence" is derived from the fact that they are periodic and reproduce every binary sequence that can be represented by the shift registers, i.e., for length-n registers they produce a sequence of length of $(2^n-1)$. The pair of maximum length sequences to be used to generate the set of Gold sequences have length $(2^n-1)$ and a cross-correlation less than or equal to $(2^{(n+2)/2})$, where n is the size of the linear feedback shift register used to generate the maximum length sequences. Based upon the disclosure provided herein, one of ordinary skill in the art will recognize how to generate a pair of maximum length sequences with a cross-correlation less than or equal to $(2^{(n+2)/2})$.

To generate the Gold sequences from the pair of maximum length sequences, one of the maximum length sequences is fixed in position while the other is shifted through a series of circular shifts of the second of the maximum length sequences, combining the fixed first sequence with each of the shifted second sequences in XOR operations to generate the set of Gold sequences. For example, the following pair of maximum length sequences c1 and c2, each with length 31, can be combined to form a set of 31 Gold sequences:

c1=[0001101111011010001111110100000]
c2=[0101100101100001001000000111010]

If c1 is fixed and c2 is shifted through each possible circular shift, and the two are combined in an XOR operation, the result is a member of the set of Gold sequences. One Gold sequence is generated with a circular shift of 0 in c2, where c2 appears as above. (In some embodiments, 0's in the patterns set forth herein are stored as −1's on the magnetic storage medium, but are shown herein as 0's for simplicity.) Another Gold sequence is generated with a circular shift of 1 in c2, as follows:

c2=[1011001011000010010000001110100]

Based upon the disclosure provided herein, one of ordinary skill in the art will recognize how to generate a set of Gold sequences based a pair of maximum length sequences. Because the resulting set of Gold sequences contains more than two patterns, an opportunity is provided to select a pair of Gold sequences from the set which will meet the needs of a particular recording system. The Gold sequences will have relatively high auto-correlation values and relatively low cross-correlation values. In some embodiments, additional criteria by which the Gold sequences to use as sync marks are selected from the set includes selecting sequences with patterns that have a relatively low probability of appearing in user data, sequences that have less impact on or cross-correlation with the preamble, and sequences that are balanced to reduce the DC component of the readback signal.

Figure 6:
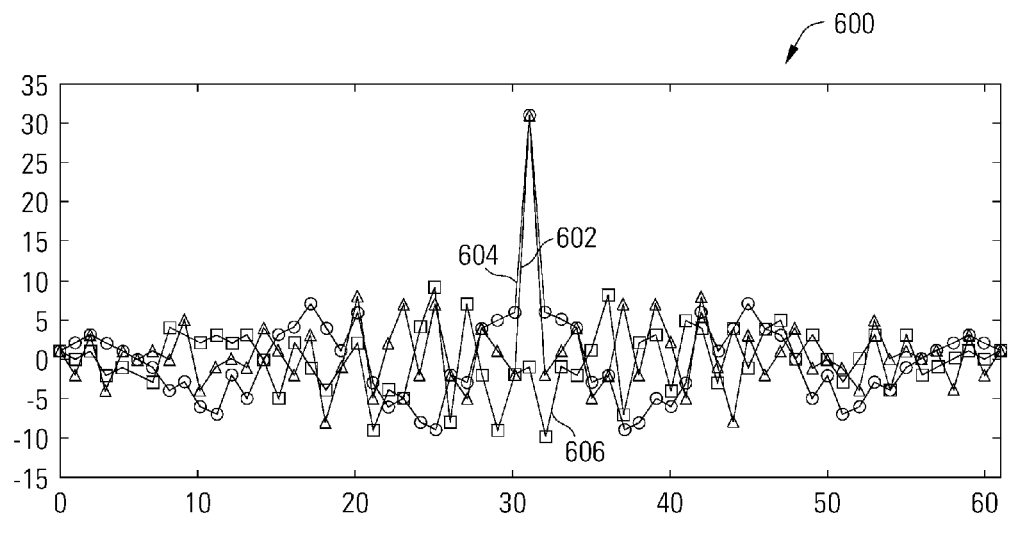
FIG. 6 is a graph of auto-correlation values for a pair of Gold sequence sync marks used in alternating data tracks, and of cross-correlation values between the pair of Gold sequence sync marks in accordance with some embodiments of the present invention.

Turning to FIG. 6, a graph 600 shows a plot of auto-correlation values 602 for a first Gold sequence, correlated with shifted versions of itself as occurs when the sync mark detector searches for the first Gold sequence in the readback signal as it is shifted in bit by bit when reading a data track using the first Gold sequence as the sync mark. Notably, the auto-correlation values 602 for the first Gold sequence have a relatively high peak (at shift offset 31 where the first Gold sequence is fully shifted into the sync mark detector). The auto-correlation values 602 for the first Gold sequence have relatively low auto-correlation values at other shift values, where the first Gold sequence is offset and the sync mark detector is also considering preamble data or user data along with a portion of the first Gold sequence.

Graph 600 also shows a plot of auto-correlation values 604 for a second Gold sequence, correlated with shifted versions of itself as occurs when the sync mark detector searches for the second Gold sequence in the readback signal as it is shifted in bit by bit when reading a data track using the second Gold sequence as the sync mark. Notably, the auto-correlation values 604 for the second Gold sequence have a relatively high peak (at shift offset 31 where the second Gold sequence is fully shifted into the sync mark detector). The auto-correlation values 604 for the second Gold sequence have relatively low auto-correlation values at other shift values, where the second Gold sequence is offset and the sync mark detector is also considering preamble data or user data along with a portion of the second Gold sequence.

Graph 600 also shows a plot of cross-correlation values 606 between the first and second Gold sequences, showing a relatively low cross-correlation for all shift values. As a result, the likelihood of false detection of a sync mark in a neighboring track when reading a target track is low.

Figure 7:
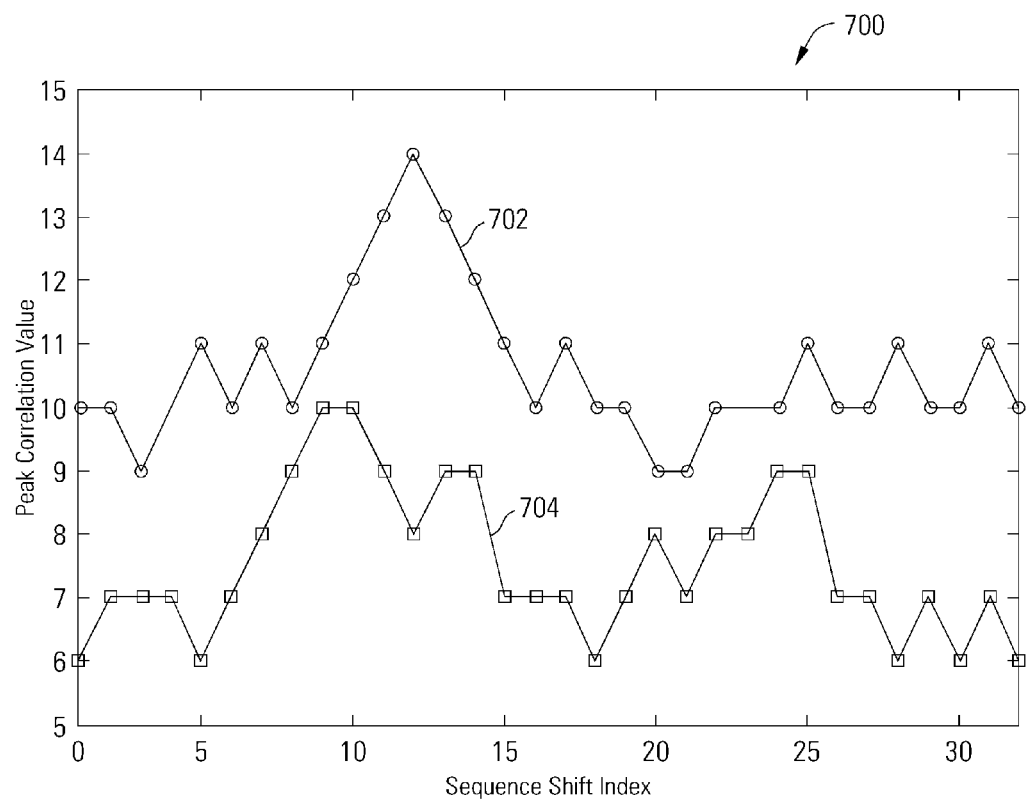
FIG. 7 is a graph of cross-correlation values between a first Gold sequence and shifted versions of the first Gold sequence at different circular shift indexes, and between the preamble and shifted versions of the first Gold sequence at different circular shift indexes, in accordance with some embodiments of the present invention.

Turning to FIG. 7, a plot 700 shows cross-correlation values 702 between a first Gold sequence and shifted versions of the first Gold sequence at different circular shift indexes. Lower cross-correlation values indicate shifted versions of the first Gold sequence that are good candidates for use as a sync mark on alternate data tracks from the first Gold sequence. Notably, a peak in the cross-correlation values 702 between about shift indexes 10 and 15 indicate that shifted Gold sequences from indexes 10 and 15 would not be the best candidates to select. In some embodiments, a threshold is used to identify shift indexes for good candidates, such as, but not limited to, a peak correlation value of about 10.5.

Plot 700 also shows cross-correlation values 704 between the preamble and shifted versions of the first Gold sequence at different circular shift indexes. For example, at sequence shift index 6, the absolute peak sidelobe value for the cross-correlation between the $6^{th}$ Gold sequence and the first Gold sequence is 7. Again, lower cross-correlation values indicate shifted versions of the first Gold sequence that are good candidates for use as a sync mark. In some embodiments, a threshold is used to identify shift indexes for good candidates, such as, but not limited to, a peak correlation value of about 7.5. An example of a good candidate selected for a sync mark based on the cross-correlation values 702, 704 is at sequence shift index 6 (among others), where the cross-correlation values 702, 704 both fall below the mentioned thresholds. Similar consideration of cross-correlation between the second Gold sequence and non-return to zero (NRZ) data in the readback signal can be used to help select a candidate Gold sequence for use as a sync mark.

In some embodiments, the sync marks used in the two dimensional magnetic recording system are not Gold codes, but shift tolerant orthogonal sequences. In these embodiments, the offset between different sync marks on adjacent tracks is limited to a maximum phase offset of D bits, so the cross-correlation constraints are relaxed. The maximum phase offset of D is a limit on the offset between the two sequences when used as sync marks on alternating tracks. If D=2, the offset can be −2, −1, 0, 1 or 2. If D=4, the offset can be −4, −3, −2, −1, 0, 1, 2, 3, or 4. Because of this limit, the cross-correlation only needs to be considered at the allowable offsets, rather than across the entire sequences. In these embodiments, a set of pseudo-random patterns {$g_i$} are used as the sync marks for different data tracks, satisfying:

$$\sum_{n=1}^{L} g_i[n+k]g_i[n] = L\delta[k] \text{ or } \sim L\delta[k] \quad \text{(Eq 4)}$$
$$\text{for } k = -D, -D+1, \ldots, D$$

$$\sum_{n=1}^{L} g_i[n+k]g_j[n] = 0 \text{ or } \sim 0 \quad \text{(Eq 5)}$$
$$\text{for } i \neq j, k = -D, -D+1, \ldots, D$$

where the sync pattern length is L+2D, and where D is the maximum write phase offset between the neighboring tracks (excluding effects of inter-symbol interference). As a special case, the sync pattern length can be L, by assuming the preamble 2T pattern and user data patterns for preceding and following bits, respectively.

For example, the following pair of shift tolerant orthogonal sequences g1 and g2 are used in some embodiments as sync marks in alternating data tracks:

g1=[1 1 0 1 1 1 0 1 1 1 0 0 0 1 0 1 0 0 1 1 1 1 0 1]
g2=[0 1 0 1 1 1 1 0 0 0 0 1 1 0 1 1 0 0 0 1 0 1 0 1]

where L=20 and D=2, where the bold sections of g1 and g2 are sync patterns of length L, the preceding two bits are preamble bits and the following two bits are user data bits. For these shift tolerant orthogonal sequences g1 and g2, the auto-correlation and cross-correlation values can be represented as:

$$\sum_{n=1}^{20} g_1[n+k]g_1[n] = 20\delta[k]$$

$$\sum_{n=1}^{20} g_2[n+k]g_2[n] = 20\delta[k]$$

$$\sum_{n=1}^{20} g_1[n+k]g_2[n] = 0$$

$$\sum_{n=1}^{20} g_2[n+k]g_1[n] = 0$$

In some embodiments with L=20 and D=4, the following pair of shift tolerant orthogonal sequences g1 and g2 are used as sync marks in alternating data tracks:

g1=[1 0 1 0 1 1 0 1 0 1 1 1 1 0 1 1 1 1 0 1 1 0 0 0 1 1 0 1]
g2=[1 1 0 1 1 1 1 1 0 0 1 0 0 0 1 0 1 1 1 0 0 1 0 1 1 1 0 0]

where the bold sections of g1 and g2 are sync patterns of length L, and the preceding four bits are preamble bits and the following two bits are user data bits. For these shift tolerant orthogonal sequences g1 and g2, the auto-correlation and cross-correlation values can be represented as:

$$\sum_{n=1}^{20} g_1[n+k]g_1[n] \rightarrow [-2, 2, 2, 0, 20, 0, 0, 0, 0]$$

$$\sum_{n=1}^{20} g_2[n+k]g_2[n] \rightarrow [-2, 0, 0, 0, 20, 0, 0, -2, 0]$$

$$\sum_{n=1}^{20} g_1[n+k]g_2[n] \rightarrow [-2, 0, 0, 0, 0, 0, 0, -2, 0]$$

$$\sum_{n=1}^{20} g_2[n+k]g_1[n] \rightarrow [-2, -2, 2, 0, 0, 0, 0, 0, 0]$$

With leading preamble and following user data bits, the shift tolerant orthogonal sequences have somewhat different auto-correlation and cross-correlation values depending on the values of the leading preamble and following user data bits:

g1=[1 1 0 0 1 0 1 1 0 0 1 1 1 1 0 1 1 1 0 1 0 0 0 0 1 0 1 0]
g2=[1 1 0 0 0 1 0 1 1 1 0 0 0 0 0 1 1 0 0 1 0 0 0 0 1 1 0 0]

$$\sum_{n=1}^{20} g_1[n+k]g_1[n] \rightarrow [0, 2, 0, 0, 20, 0, 0, 0, 2]$$

-continued $$\sum_{n=1}^{20} g_2[n+k]g_2[n] \to [0, -2, 0, 4, 20, 2, -2, -2, 0]$$

$$\sum_{n=1}^{20} g_1[n+k]g_2[n] \to [0, 2, 0, 0, 0, -2, 2, 2, 0]$$

$$\sum_{n=1}^{20} g_2[n+k]g_1[n] \to [0, 2, 0, 0, 0, 0, 0, 0, 2]$$

and
g1=[1 1 0 0 1 0 1 1 0 0 1 1 1 1 0 1 1 1 0 1 0 0 0 0 1 1 1 1]
g2=[1 1 0 0 0 1 0 1 1 1 0 0 0 0 0 1 1 0 0 1 0 0 0 0 0 1 1 1]

$$\sum_{n=1}^{20} g_1[n+k]g_1[n] \to [0, 2, 0, 0, 20, 0, -2, -2, -2]$$

$$\sum_{n=1}^{20} g_2[n+k]g_2[n] \to [0, -2, 0, 4, 20, 4, 0, -2, -2]$$

$$\sum_{n=1}^{20} g_1[n+k]g_2[n] \to [0, 2, 0, 0, 0, 0, 0, 2, -2]$$

$$\sum_{n=1}^{20} g_2[n+k]g_1[n] \to [0, 2, 0, 0, 0, 0, -2, -2, -2]$$

Figure 8:
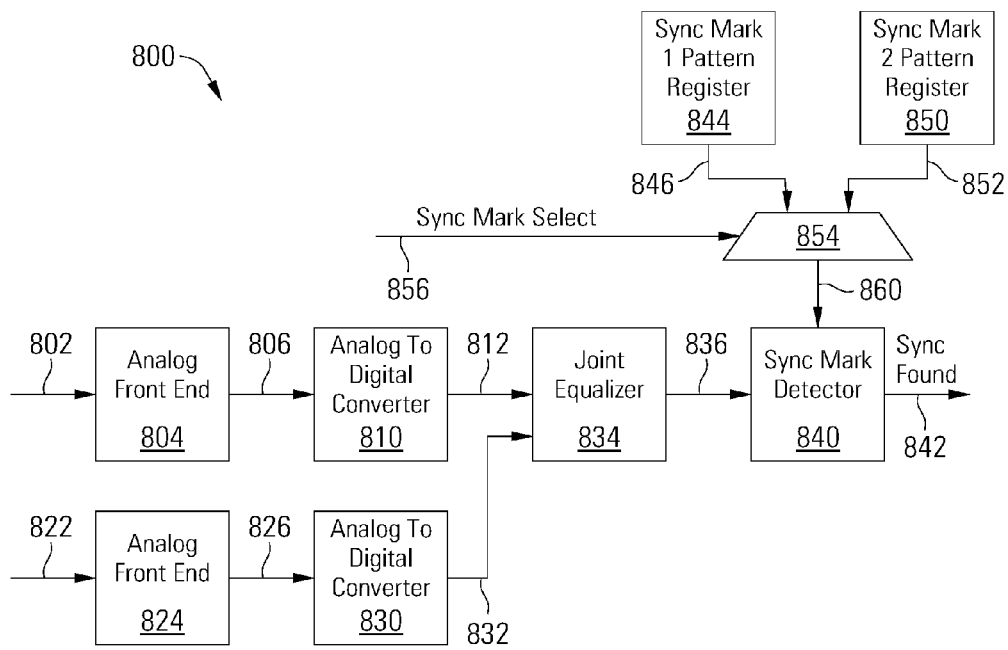
FIG. 8 depicts a data processing circuit including a sync mark detector for multiple sync marks, where multiple readers read a data track, in accordance with some embodiments of the present invention.

Turning to FIG. 8, a data processing circuit 800 is showing including a sync mark detector 820 for multiple sync marks 826, 832 in accordance with some embodiments of the present invention. Data processing circuit 800 is operable to read a data track with multiple read sensors. From a first read sensor, a first analog front end circuit 804 receives an analog signal 802 read from the data track. Analog front end circuit 804 processes analog signal 802 and provides a processed analog signal 806 to an analog to digital converter circuit 810. Analog front end circuit 804 may include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 804. In some cases, analog input signal 802 is derived from a read/write head assembly (not shown) that is disposed in relation to a storage medium (not shown). Based upon the disclosure provided herein, one of ordinary skill in the art will recognize a variety of sources from which analog signal 802 may be derived.

Analog to digital converter circuit 810 converts processed analog signal 806 into a corresponding series of digital samples 812. Analog to digital converter circuit 810 can be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

From a second read sensor, a second analog front end circuit 824 receives an analog signal 822 read from the data track. Analog front end circuit 824 processes analog signal 822 and provides a processed analog signal 826 to an analog to digital converter circuit 830. Analog front end circuit 824 may include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 824.

Analog to digital converter circuit 830 converts processed analog signal 826 into a corresponding series of digital samples 832. Analog to digital converter circuit 830 can be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

A joint equalizer circuit 834 receives digital samples 812, 832 and applies a joint equalization algorithm to digital samples 812, 832 to yield an equalized output 836 corresponding to the data track being read. In some embodiments of the present invention, equalizer circuit 834 is a digital finite impulse response filter circuit as are known in the art.

Equalized output 836 is provided to a sync mark detector 840. Sync mark detector 840 compares equalized output 836 as it is received with a sync mark target for one of multiple sync marks 846, 852, selected based on the target data track and the particular sync mark associated with the target data track. In some embodiments, the sync mark target is obtained by convolving the sync mark pattern with an equalization target response which is sometimes also known as partial response target. A multiplexer 854 selects between the multiple sync marks 846, 852 under control of a sync mark select signal 856, yielding the sync mark 860 being sought.

Again, at least two different sync marks 846, 852 are used in alternating data tracks, such that the different sync marks 846, 852 have different bit patterns or sequences. In some embodiments, one sync mark 846 is used on every other data track, such as, but not limited to, odd numbered tracks, and another sync mark 852 is used on the intervening data tracks, such as, but not limited to, even numbered tracks, with the sync mark select signal 856 controlling the multiplexer 854 based on the sync mark used in the target track. In other embodiments, more than two different sync marks are used, such that sync marks in any given target track are different from and have low cross-correlation values with sync marks in its adjacent neighboring tracks.

The sync marks 846, 852 are stored in sync mark pattern registers 844, 850 in some embodiments. Sync mark pattern registers 844, 850 can either be hard coded, or reprogrammable depending upon the particular implementation. In some embodiments of the present invention, the sync marks 846, 852 stored in sync mark pattern registers 844, 850 are Gold sequences selected based on the criteria disclosed above. In some other embodiments of the present invention, the sync marks 846, 852 stored in sync mark pattern registers 844, 850 are shift tolerant orthogonal sequences.

Sync mark detector 840 compares equalized output 836 as it is received with the sync mark 860 (or sync mark target) corresponding with the target track being read, yielding a sync found signal 842 when the sync mark 860 is detected. This indicates the location of the start of user data in that particular sector.

The algorithm applied by sync mark detector 840 to correlate the equalized output 836 with the sync mark 860 to detect the sync mark can be any suitable correlation algorithm, such as, but not limited to, direct correlation, block correlation, norm-distance based approaches, etc. Based upon the disclosure provided herein, one of ordinary skill in the art will recognize a variety of correlation algorithms that could be used by sync mark detector 840 in relation to different embodiments of the present invention. In some embodiments, the comparison metric is a Euclidean distance between equalized output 836 and the a target output for the sync mark 860 in accordance with the following equation:

$$\text{metric} = \sum_{k=0}^{i} (\text{equalized output}_k - \text{sync mark target})^2 \quad \text{(Eq 6)}$$

where k represents an individual sample value. In some embodiments, the sync mark target is obtained by convolving the sync mark pattern 860 with an equalization target response which is sometimes also known as partial response target. When the metric exceeds a threshold, the sync mark detector 840 asserts the sync found signal 842, indicating that the sync mark 860 has been detected in equalized output 836.

In some embodiments, the sync mark detector operates on the digital samples, or X samples, from the analog to digital converters 810, 830, rather than on equalized samples 836, or Y samples, from the joint equalizer 834.

Figure 9:
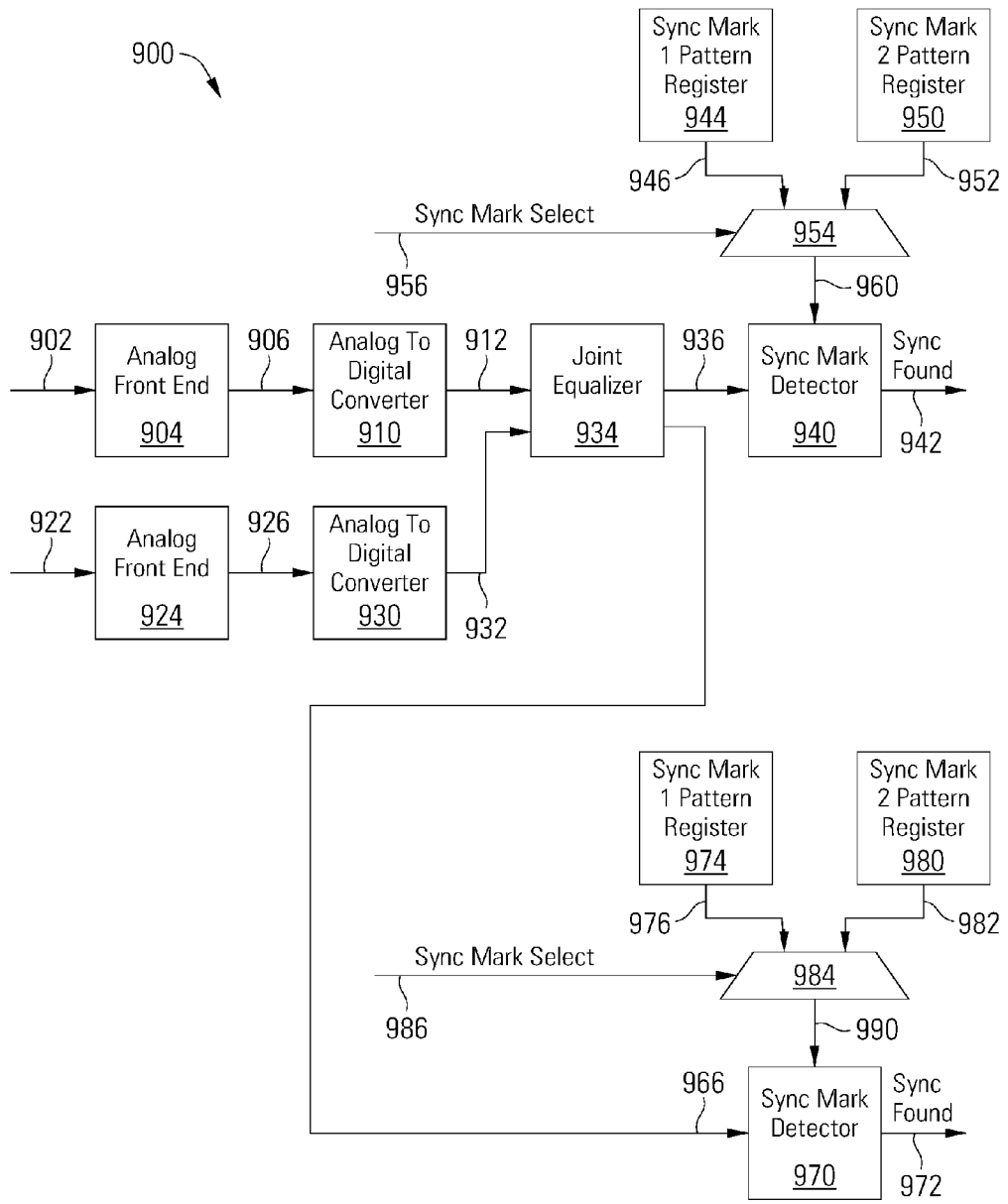
FIG. 9 depicts a data processing circuit including sync mark detectors for multiple sync marks, where multiple readers read multiple data tracks, in accordance with some embodiments of the present invention.

Turning to FIG. 9, a data processing circuit 900 is showing including a sync mark detector 940 for multiple sync marks 946, 952 in accordance with some embodiments of the present invention. Data processing circuit 900 is operable to read multiple data tracks with multiple read sensors, or more particularly, to read two data tracks with two read sensors. A sync found signal is produced for each of the two data tracks, by detecting a different sync mark in each of the two data tracks. From a first read sensor, a first analog front end circuit 904 receives an analog signal 902 read from the first data track. Analog front end circuit 904 processes analog signal 902 and provides a processed analog signal 906 to an analog to digital converter circuit 910. Analog front end circuit 904 may include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 904. In some cases, analog input signal 902 is derived from a read/write head assembly (not shown) that is disposed in relation to a storage medium (not shown). Based upon the disclosure provided herein, one of ordinary skill in the art will recognize a variety of sources from which analog signal 902 may be derived.

Analog to digital converter circuit 910 converts processed analog signal 906 into a corresponding series of digital samples 912. Analog to digital converter circuit 910 can be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

From a second read sensor, a second analog front end circuit 924 receives an analog signal 922 read from the second data track. Analog front end circuit 924 processes analog signal 922 and provides a processed analog signal 926 to an analog to digital converter circuit 930. Analog front end circuit 924 may include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 924.

Analog to digital converter circuit 930 converts processed analog signal 926 into a corresponding series of digital samples 932. Analog to digital converter circuit 930 can be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

A joint equalizer circuit 934 receives digital samples 912, 932 and applies a joint equalization algorithm to digital samples 912, 932 to yield an equalized output 916 corresponding to the data track being read. In some embodiments of the present invention, equalizer circuit 934 is a digital finite impulse response filter circuit as are known in the art.

Equalized output 936, corresponding to the first data track being read, is provided to a sync mark detector 940. Sync mark detector 940 compares equalized output 936 as it is received with a sync mark target for one of multiple sync marks 946, 952, selected based on the target data track and the particular sync mark associated with the target data track. In some embodiments, the sync mark target is obtained by convolving the sync mark pattern with an equalization target response which is sometimes also known as partial response target. A multiplexer 954 selects between the multiple sync marks 946, 952 under control of a sync mark select signal 956, yielding the sync mark 960 being sought.

Again, at least two different sync marks 946, 952 are used in alternating data tracks, such that the different sync marks 946, 952 have different bit patterns or sequences. In some embodiments, one sync mark 946 is used on every other data track, such as, but not limited to, odd numbered tracks, and another sync mark 952 is used on the intervening data tracks, such as, but not limited to, even numbered tracks, with the sync mark select signal 956 controlling the multiplexer 954 based on the sync mark used in the target track. In other embodiments, more than two different sync marks are used, such that sync marks in any given target track are different from and have low cross-correlation values with sync marks in its adjacent neighboring tracks.

The sync marks 946, 952 are stored in sync mark pattern registers 944, 950 in some embodiments. Sync mark pattern registers 944, 950 can either be hard coded, or reprogrammable depending upon the particular implementation. In some embodiments of the present invention, the sync marks 946, 952 stored in sync mark pattern registers 944, 950 are Gold sequences selected based on the criteria disclosed above. In some other embodiments of the present invention, the sync marks 946, 952 stored in sync mark pattern registers 944, 950 are shift tolerant orthogonal sequences.

Sync mark detector 940 compares equalized output 936 as it is received with the sync mark 960 (or sync mark target) corresponding with the target track being read, yielding a sync found signal 942 when the sync mark 960 is detected. This indicates the location of the start of user data in that particular sector in the first data track.

Equalized output 966, corresponding to the second data track being read, is provided to a second sync mark detector 970, which searches for a different sync mark than sync mark detector 940. Sync mark detector 970 compares equalized output 966 with a sync mark target for one of multiple sync marks 976, 982, selected based on the target data track and the particular sync mark associated with the target data track. In some embodiments, the sync mark target is obtained by convolving the sync mark pattern with an equalization target response which is sometimes also known as partial response target. A multiplexer 984 selects between the multiple sync marks 976, 982 under control of a sync mark select signal 986, yielding the sync mark 990 being sought.

The sync marks 976, 982 are stored in sync mark pattern registers 974, 980, which, in some embodiments, are the same registers as 944, 950. In some embodiments of the present invention, the sync marks 976, 982 are Gold sequences selected based on the criteria disclosed above. In some other embodiments of the present invention, the sync marks 976, 982 are shift tolerant orthogonal sequences.

Sync mark detector 970 compares equalized output 966 with the sync mark 990 (or sync mark target) corresponding with the target track being read, yielding a sync found signal 972 when the sync mark 990 is detected. This indicates the location of the start of user data in that particular sector in the second data track.

Figure 10:
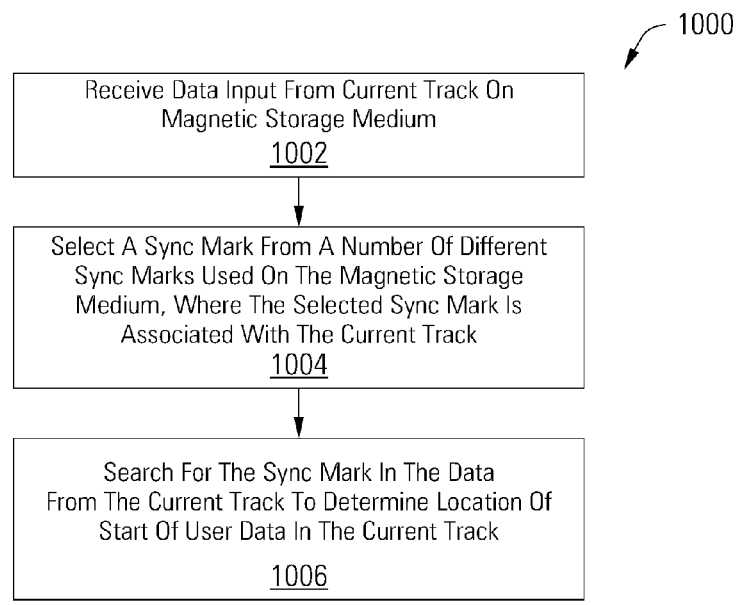
FIG. 10 is a flow diagram showing a method for locating the position of the start of user data in each sector in each trackin accordance with some embodiments of the present invention.

Turning to FIG. 10, a flow diagram 1000 shows a method for locating the position of the start of user data in a data track in accordance with some embodiments of the present invention. Following flow diagram 1000, a data input is received, read from a current track on a magnetic storage medium. (Block 1002) A sync mark is selected from among a number of different sync marks used on the magnetic storage medium, where the selected sync mark is associated with the current track. (Block 1004) In some embodiments, the sync marks are different Gold sequences with relatively high auto-correlation values and relatively low cross-correlation values with each other and with the preamble and NRZ data. In some embodiments, the sync marks are shift tolerant orthogonal sequences with relatively high auto-correlation values and with relatively low cross-correlation values over limited offsets. The sync mark is searched for in the data from the current track to locate the position of the start of user data. (Block 1006)

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel sync mark systems and methods for two dimensional magnetic recording. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
an analog to digital converter operable to sample an analog signal obtained from a magnetic storage medium to yield digital samples; and
a sync mark detector operable to search for a particular one of a plurality of sync marks in the digital samples, wherein each of a plurality of data tracks on the magnetic storage medium is associated with one of the plurality of sync marks, and wherein the sync mark on each of the plurality of data tracks has a different pattern than the sync marks on neighboring tracks, wherein the data processing system is embodied in a two dimensional magnetic recording system comprising a plurality of read sensors, the data processing system comprising a plurality of sync mark detectors, one for each of the read sensors.

2. The data processing system of claim 1, further comprising a plurality of sync mark registers operable to provide the plurality of sync marks.

3. The data processing system of claim 1, further comprising a sync mark selector operable to provide the particular one of the plurality of sync marks to the sync mark detector based on which of the plurality of data tracks sourced the analog signal.

4. The data processing system of claim 1, wherein the sync mark detector comprises a sync detected output operable to signal when said particular one of the plurality of sync marks is detected in the digital samples.

5. The data processing system of claim 1, wherein the plurality of sync marks comprise Gold code sequences.

6. The data processing system of claim 5, wherein the Gold code sequences are generated from a pair of maximum length sequences.

7. The data processing system of claim 5, wherein the Gold code sequences are selected to have a cross-correlation value below a threshold.

8. The data processing system of claim 5, wherein the Gold code sequences are balanced to comprise a number of 0'1 and 1's that differs by one.

9. The data processing system of claim 5, wherein the Gold code sequences are selected to have a cross-correlation value with a preamble that is below a threshold.

10. The data processing system of claim 5, wherein the Gold code sequences are each selected to have auto-correlation values above a threshold.

11. The data processing system of claim 1, wherein the digital samples comprise encoded data in which sequences matching the plurality of sync marks have been replaced.

12. The data processing system of claim 1, wherein the plurality of sync marks comprise orthogonal sequences selected to have cross-correlation values below a threshold over a limited offset range between the sync marks on adjacent data tracks.

13. The data processing system of claim 1, further comprising an analog front end operable to reduce a direct current component in the analog signal and an equalizer operable to filter the digital samples.

14. The data processing system of claim 1, wherein the system is implemented as an integrated circuit.

15. The data processing system of claim 1, wherein the circuit is incorporated in a storage device.

16. A method for detecting a location of user data on a recording medium, comprising:
receiving a data input from a data track on a magnetic storage medium;
selecting a sync mark associated with the data track from among a plurality of different sync mark patterns on the magnetic storage medium; and
searching for the sync mark in the data input to detect the location of the user data based on a location of the sync mark in the data input, wherein the plurality of different sync mark patterns comprise orthogonal sequences selected to have cross-correlation values below a threshold across a limited offset range between the sync marks on adjacent data tracks.

17. The method of claim 16, wherein the plurality of different sync mark patterns comprise Gold code sequences selected based on auto-correlation values, cross-correlation values with each other and with a preamble, and a balance between a number of 0's and 1's in each Gold code sequence.

18. A storage device, comprising:
a storage medium operable to store a plurality of data tracks with sync marks, and wherein the sync mark in each data track is different from the sync marks in adjacent data tracks;
a two dimensional head assembly comprising a plurality of read sensors disposed in relation to the storage medium and operable to read and write data on the storage medium; and
a plurality of sync mark detectors, one for each of the read sensors, operable to search for a particular one of the sync marks in data from the head assembly.

19. The storage device of claim 18, wherein the sync marks on adjacent data tracks are selected to have a cross-correlation value below a threshold.

20. The storage device of claim 18, further comprising a sync mark selector operable to provide the particular one of the plurality of sync marks to the sync mark detector based on which of the plurality of data tracks sourced the analog signal.

* * * * *